(12) United States Patent
Minowa (10) Patent No.: US 9,891,462 B2
(45) Date of Patent: *Feb. 13, 2018

(54) COLOR FILTER SUBSTRATE, LIQUID CRYSTAL PANEL, AND REPAIR METHOD

(71) Applicant: Mitsubishi Electric Corporation, Tokyo (JP)

(72) Inventor: Kenichi Minowa, Kumamoto (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/259,583

(22) Filed: Sep. 8, 2016

(65) Prior Publication Data

US 2016/0377916 A1 Dec. 29, 2016

Related U.S. Application Data

(63) Continuation of application No. 14/448,019, filed on Jul. 31, 2014, now Pat. No. 9,465,248.

(30) Foreign Application Priority Data

Aug. 7, 2013 (JP) .................................. 2013-163922

(51) Int. Cl.
*G02F 1/1335* (2006.01)
*G02F 1/13* (2006.01)
*G02F 1/1337* (2006.01)

(52) U.S. Cl.
CPC ...... *G02F 1/133514* (2013.01); *G02F 1/1309* (2013.01); *G02F 1/1337* (2013.01)

(58) Field of Classification Search
CPC ............ G02F 1/1309; G02F 1/136259; G02F 2201/506–2201/508; G02F 1/133514; G02F 1/134363
USPC .......................................................... 445/2
See application file for complete search history.

(56) References Cited

U.S. PATENT DOCUMENTS

| 7,915,810 B2* | 3/2011 | Kinoshita ......... G02F 1/136259 313/500 |
| 9,465,248 B2* | 10/2016 | Minowa ............ G02F 1/133514 |
| 2006/0126003 A1* | 6/2006 | Yoo .................... G02F 1/136259 349/192 |

(Continued)

FOREIGN PATENT DOCUMENTS

| JP | H06-051328 A | 2/1994 |
| JP | H07-333588 A | 12/1995 |

(Continued)

OTHER PUBLICATIONS

An Office Action; "Notice of Reasons for Rejection", issued by the Japanese Patent Office dated May 30, 2017, which corresponds to Japanese Patent Application No. 2013-163922 and is related to U.S. Appl. No. 15/259,583; with partial English language translation.

*Primary Examiner* — Jia Pan
(74) *Attorney, Agent, or Firm* — Studebaker & Brackett PC (57) ABSTRACT

A color filter substrate includes a color material layer that transmits light to generate colors of an image, and a change layer that is formed on a surface of the color material layer on which light is incident or on a surface of the color material layer from which light is emitted, and that has a characteristic in which a portion irradiated with laser light changes into black.

3 Claims, 5 Drawing Sheets

(56) References Cited

U.S. PATENT DOCUMENTS

| | | | | |
|---|---|---|---|---|
| 2014/0293187 A1* | 10/2014 | Nam | ................... | G02F 1/13362 349/62 |
| 2014/0340622 A1* | 11/2014 | Ono | ................. | G02F 1/134363 349/138 |
| 2014/0362317 A1* | 12/2014 | Kubota | ............. | G02F 1/133707 349/39 |
| 2016/0062203 A1* | 3/2016 | Ono | ................. | G02F 1/134363 349/43 |

FOREIGN PATENT DOCUMENTS

| | | | |
|---|---|---|---|
| JP | H09-230325 | A | 9/1997 |
| JP | 2000-221487 | A | 8/2000 |
| JP | 2001-172041 | A | 6/2001 |
| JP | 2004-145327 | A | 5/2004 |
| JP | 2010-054580 | A | 3/2010 |
| JP | 2010-530991 | A | 9/2010 |
| WO | 2008/156280 | A1 | 12/2008 |

\* cited by examiner

COLOR FILTER SUBSTRATE, LIQUID CRYSTAL PANEL, AND REPAIR METHOD

CROSS REFERENCE TO RELATED APPLICATIONS

This application is a Continuation Application of U.S. patent application Ser. No. 14/448,019, filed on Jul. 31, 2014, which claims priority to and the benefit of Japanese Patent Application No. 2013-163922, filed on Aug. 7, 2013, the entire contents of which all are incorporated herein by reference.

BACKGROUND OF THE INVENTION

Field of the Invention

The present invention relates to a color filter substrate, a liquid crystal panel, and a repair method, in which a process utilizing laser light is performed.

Description of the Background Art

Recently, an FPD (Flat Panel Display) such as a liquid crystal panel has been utilized in many fields including a television set, a car navigation system, and a computer, because it is lightweight, thin in size, and has low power consumption. The panel of the FPD has been demanded to be large and to have no defective pixels year after year. Therefore, a repair technique for a defective part is inevitable for enhancing productivity in a manufacturing plant.

A liquid crystal panel includes a pair of opposing substrates. A distance between the pair of substrates of the liquid crystal panel is kept constant by a spacer. Liquid crystal is filled between the pair of substrates. One of the pair of substrates is an active matrix substrate (hereinafter also referred to as TFT (Thin Film Transistor) substrate) on which a thin-film transistor is formed. The other one (counter substrate) of the pair of substrates is a color filter substrate (hereinafter also referred to as CF).

A conductive film is formed on the TFT substrate and the CF. The drive of the liquid crystal is controlled by charges accumulated between the conductive film on the TFT substrate and the conductive film on the CF. The control of driving the liquid crystal on the portion where the transistor is formed and on a wiring portion on the TFT substrate is more difficult than the control of driving the liquid crystal on a display portion. In view of this, a shielding region (hereinafter also referred to as BM (Black Matrix)) is formed on the CF to suppress light transmission. With this structure, a clear image can be displayed.

The TFT substrate includes a plurality of independent pixels. When a pattern failure occurs, or an impurity (foreign matter) enters between the TFT substrate and the CF, on one pixel during a manufacturing process of the TFT, this pixel becomes a defective pixel as a bright spot brighter than the peripheral pixels. The defective pixel causes deterioration in quality of the liquid crystal panel. In the description below, the defective pixel as the bright spot is also referred to as a bright spot pixel.

A demand for a high-quality liquid crystal panel with no bright spot pixel has been more and more increasing in the market. Even if a liquid crystal panel has only one bright spot pixel out of several tens of thousands of pixels forming this liquid crystal panel, this liquid crystal panel is determined to be defective in some cases.

In order to solve the occurrence of the defect, a repair method (technique) is significant. The repair method includes a relatively easy method of repairing only one defective pixel out of several tens of thousands of pixels. According to this repair method, a yield and quality of the liquid crystal panel can be enhanced.

As the repair method of repairing the defective pixel that is a bright spot pixel brighter than peripheral pixels, a method of making the bright spot pixel into a black spot so as to make this bright spot pixel less noticeable than the peripheral pixels has been known. There has been proposed a method in which a gate terminal and a drain terminal of a target pixel are electrically connected by irradiation of laser light, and a constant voltage is applied to make the target pixel always display black, as a repair technique of making the bright spot pixel into a black spot.

This method is effective when a defective pattern is generated on the TFT substrate. However, this method cannot be used for a defect in which foreign matters are present between the TFT substrate and the CF. This method also entails a risk of reappearance of the bright spot pixel later due to disconnection between the portion irradiated with the laser light and the gate, when a connection between this portion and the gate is weak.

In addition to the method of making a bright spot pixel into a black spot with an electric control, there is a method of making a bright spot pixel into a black spot by blackening the bright spot pixel itself. For example, Japanese Patent Application Laid-Open No. 07-333588 (1995) describes a technique (hereinafter also referred to as a related technique A) of forming a light-shielding layer on a portion corresponding to a bright spot pixel (bright spot defect) on an outer surface of a glass substrate. This related technique A can make the bright spot pixel invisible from a front of the liquid crystal panel.

Japanese Translation of PCT International Application Publication No. 2010-530991 describes a technique (hereinafter also referred to as a related technique B) of blackening a part of a color material layer (color filter substrate), included in a CF, by irradiation of laser light to a portion (region) corresponding to a bright spot pixel. This related technique B can make the bright spot pixel unnoticeable.

However, the related technique B has a problem described below. Specifically, in the related technique B, high-output laser light for blackening the color material layer is focused on the color material layer, and with this state, this laser light is emitted to the color material layer. Therefore, the color material layer might be damaged. When the color material layer is damaged, a pigment component forming the color material layer flows into a liquid crystal layer, and the flown pigment component might cause a failure in an orientation film. When a failure occurs on the orientation film, quality of an image displayed on the liquid crystal panel is deteriorated.

Specifically, the related technique B has a problem in which a failure caused by damage of the color material layer is likely to occur, because high-output laser light for blackening the color material layer is focused on the color material layer, and with this state, this laser light is emitted to the color material layer. In order to prevent the occurrence of a failure caused by damage of the color material layer, the damage of the color material layer has to be prevented. The related technique A does not describe a technique of solving the problem of the related technique B.

SUMMARY OF THE INVENTION

The present invention aims to provide a color filter substrate that can prevent damage of a color material layer due to an irradiation of laser light.

According to one aspect of the present invention, a color filter substrate is used in a liquid crystal panel displaying an image, and the color filter substrate transmits light to generate colors of the image. The color filter substrate includes a color material layer that transmits light to generate colors of the image, and a change layer that is formed on a surface of the color material layer on which the light is incident or on a surface of the color material layer from which the light is emitted, that has translucency, and that has a characteristic in which a portion irradiated with laser light changes into black.

According to the present invention, the color filter substrate includes the color material layer that transmits light to generate colors of the image, and the change layer that has the characteristic in which the portion irradiated with the laser light changes into black. In other words, the color filter substrate includes the change layer in addition to the color material layer.

According to this configuration, if the liquid crystal panel has a defective pixel as a bright spot, and this defective pixel is to be repaired, it is only necessary that the laser light is focused on the portion corresponding to the defective pixel in order to irradiate this corresponding portion with the laser light. Specifically, it is unnecessary to focus a high-output laser light for blackening a color material layer on the color material layer in order to irradiate the color material layer with the laser light, unlike the conventional case. Accordingly, damage of the color material layer caused by the irradiation of the laser light can be prevented.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferable embodiments of the present invention will be described below with reference to the drawings. In the description below, the same components are identified by the same numerals. The name and function of these components are the same. Accordingly, the detailed description of these components may be skipped in some cases.

A size, material, shape, and relative arrangement of each component illustrated in the embodiments are changed, according to need, depending upon a configuration of an apparatus to which the present invention is applied, and various conditions. The present invention is not limited to these embodiments. A size of each component in each figure may be different from the actual size.

<First preferred embodiment>

Figure 1:
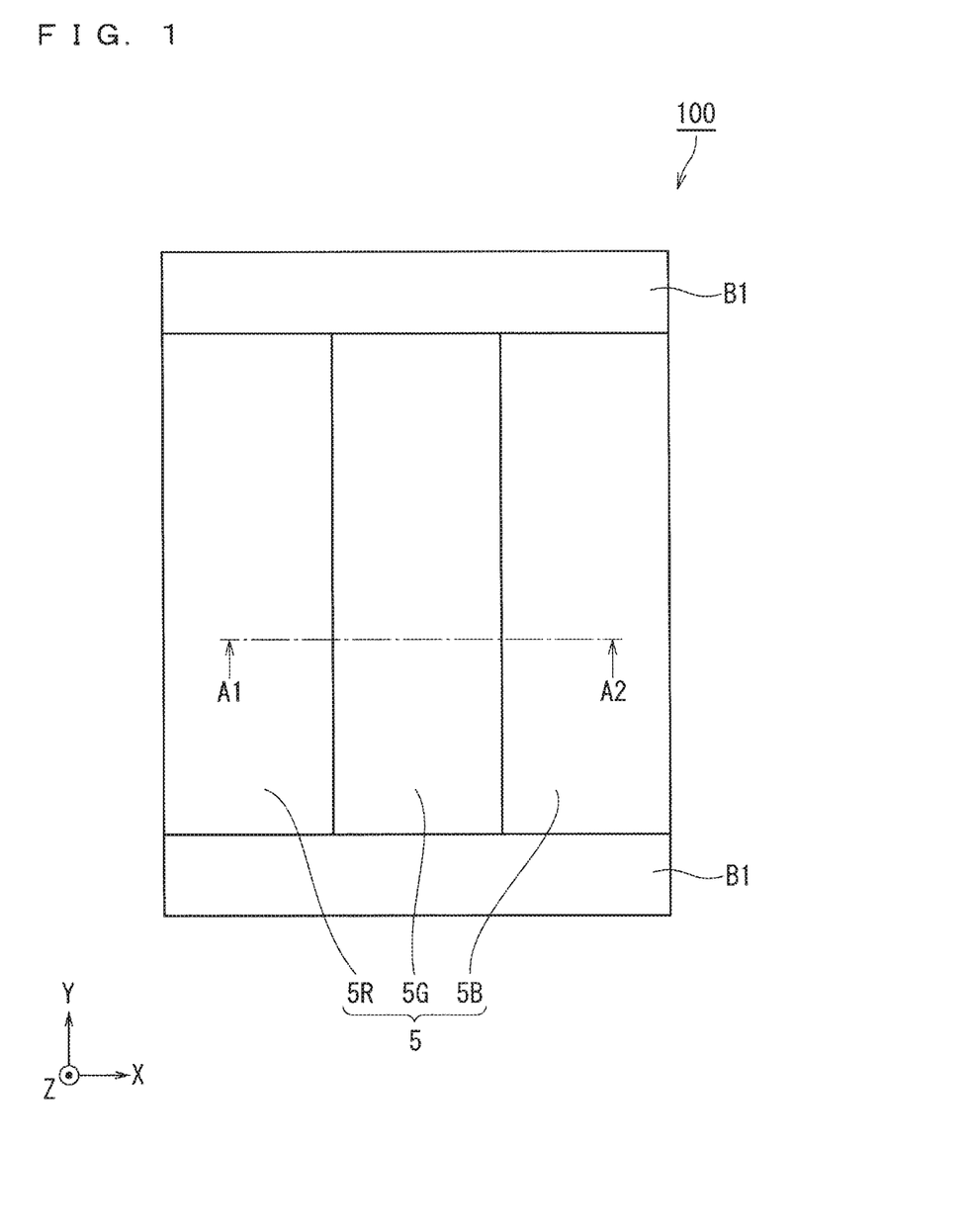
FIG. 1 is a plan view illustrating a part of a liquid crystal panel according to a first preferred embodiment.

FIG. 1 is a plan view illustrating a part of a liquid crystal panel 100 according to a first preferred embodiment of the present invention. The liquid crystal panel 100 is an active matrix liquid crystal panel, for example. The liquid crystal panel 100 includes a plurality of pixels 5 arranged in a matrix. The liquid crystal panel 100 displays an image by utilizing the plurality of pixels 5. Specifically, FIG. 1 is a plan view illustrating one of the plurality of pixels 5 included in the liquid crystal panel 100.

In FIG. 1, X, Y, and Z directions are mutually orthogonal. X, Y, and Z directions in the drawings described below are also mutually orthogonal. In the description below, a direction including the X direction and a direction (−X direction) opposite to the X direction is referred to as an X-axis direction. In the description below, a direction including the Y direction and a direction (−Y direction) opposite to the Y direction is referred to as a Y-axis direction. In the description below, a direction including the Z direction and a direction (−Z direction) opposite to the Z direction is referred to as a Z-axis direction.

Figure 2:
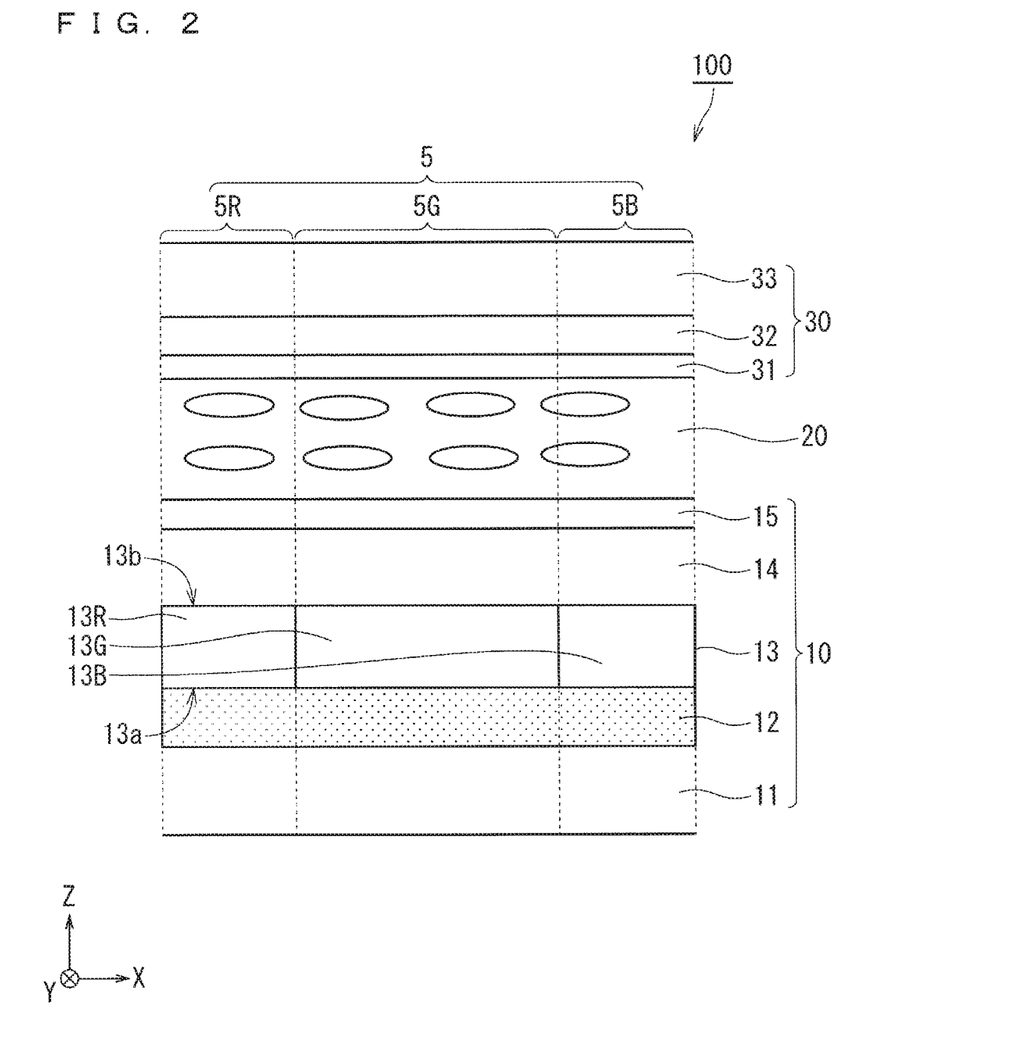
FIG. 2 is a sectional view illustrating a part of the liquid crystal panel according to the first preferred embodiment.

FIG. 2 is a sectional view illustrating a part of the liquid crystal panel 100 according to the first preferred embodiment of the present invention. Specifically, FIG. 2 is a sectional view illustrating a part of the liquid crystal panel 100 taken along a line A1-A2 in FIG. 1. The liquid crystal panel 100 includes a light source L (not illustrated). The light source L emits light. In FIG. 2, the light source L is provided below a later-described color filter substrate 10. The light source L emits light in the Z direction from below the later-described color filter substrate 10.

Referring to FIG. 1, a black matrix B1 is formed on two opposing sides of the pixel 5. The pixel 5 includes sub-pixels 5R, 5G, and 5B. The sub-pixel 5R is a pixel emitting red light according to need. The sub-pixel 5G is a pixel emitting green light according to need. The sub-pixel 5B is a pixel emitting blue light according to need. In the description below, the sub-pixels 5R, 5G, and 5B are also collectively referred to as a sub-pixel.

Referring to FIG. 2, the liquid crystal panel 100 includes the color filter substrate 10, a liquid crystal layer 20, and a TFT substrate 30. Specifically, the color filter substrate 10 is used for the liquid crystal panel 100. The color filter substrate 10 is a substrate that transmits light. The color filter substrate 10 transmits light to generate colors of an image, the detail of which will be described later.

The color filter substrate 10 includes a glass substrate 11, a change layer 12, a color material layer 13, an upper layer 14, and an orientation film 15.

The color material layer 13 is a layer transmitting light. The color material layer 13 transmits light from the above light source L to generate colors of an image. The color material layer 13 includes surfaces 13a and 13b. The surface 13a is a surface on which the light from the light source L is incident. The surface 13b is a surface from which the light from the light source L is emitted.

The color material layer 13 includes color materials 13R, 13G, and 13B formed for each pixel 5. The color material 13R is a red material that changes light passing through the color material 13R into red light. The color material 13G is a green material that changes light passing through the color material 13G into green light. The color material 13B is a blue material that changes light passing through the color material 13B into blue light.

The change layer 12 is a transparent layer that transmits light in an initial state. Specifically, the change layer 12 has translucency. The change layer 12 is a layer (film) having a characteristic in which a portion irradiated with laser light changes into black. In other words, the change layer 12 is a blackened layer. The portion of the change layer 12 changed into black does not transmit light.

The change layer 12 is an organic film layer made of an organic film. In this case, the change layer 12 is made of acrylic resin or polyimide resin. According to this structure, the change layer 12 is easy to be effectively blackened due to the irradiation of laser light.

The change layer 12 may be a layer other than the organic film layer. For example, the change layer 12 may be a conductive film layer (transparent electrode) including a conductive film. When the change layer 12 is a conductive film layer, the change layer 12 is made of indium tin oxide (ITO), indium zinc oxide (IZO (registered trademark)), or the like.

In the present preferred embodiment, the change layer 12 is formed between the glass substrate 11 and the color material layer 13. Specifically, the change layer 12 is formed on the surface 13a of the color material layer 13.

The upper layer 14 is formed on the color material layer 13. The upper layer 14 is an organic layer made of an organic film. The upper layer 14 is not limited to the organic layer, but may be a layer including an organic film and a transparent electrode. Since the upper layer 14 serving as an organic film is formed on the color material layer 13, a flow of a contaminated substance such as a pigment from the color material layer 13 into the liquid crystal layer 20 is prevented. The orientation film 15 is formed on the upper layer 14.

The TFT substrate 30 is a substrate that transmits light. A thin film transistor (not illustrated) is formed on the TFT substrate 30. The liquid crystal panel 100 drives the liquid crystal layer 20 for each sub-pixel by the thin film transistor.

Specifically, the TFT substrate 30 includes an orientation film 31, a transparent conductive film 32, and a glass substrate 33. The transparent conductive film 32 is formed on the orientation film 31. The transparent conductive film 32 is a film having an electrode formed thereon. The glass substrate 33 is formed on the transparent conductive film 32.

The liquid crystal layer 20 is a layer that changes light transmittance by utilizing a change in an alignment of a liquid crystal molecule with an application of an electric field to the liquid crystal layer 20 for each sub-pixel. The liquid crystal layer 20 is formed between the color filter substrate 10 and the TFT substrate 30. Specifically, the liquid crystal layer 20 is formed between the orientation film 15 of the color filter substrate 10 and the orientation film 31 of the TFT substrate 30.

In the liquid crystal panel 100 configured as described above, when the thin film transistor is driven to apply an electric filed to the liquid crystal layer 20 for each sub-pixel, light transmittance of the liquid crystal layer 20 is changed for each sub-pixel depending on an image that is to be displayed. Thus, the liquid crystal panel 100 can display an image.

Subsequently, a process (hereinafter also referred to as a pixel repair process N) of repairing a defective pixel which is present as a bright spot in the plurality of pixels 5 included in the liquid crystal panel 100 will be described. In the description below, the defective pixel as a bright spot is also referred to as a bright spot pixel.

Figure 3:
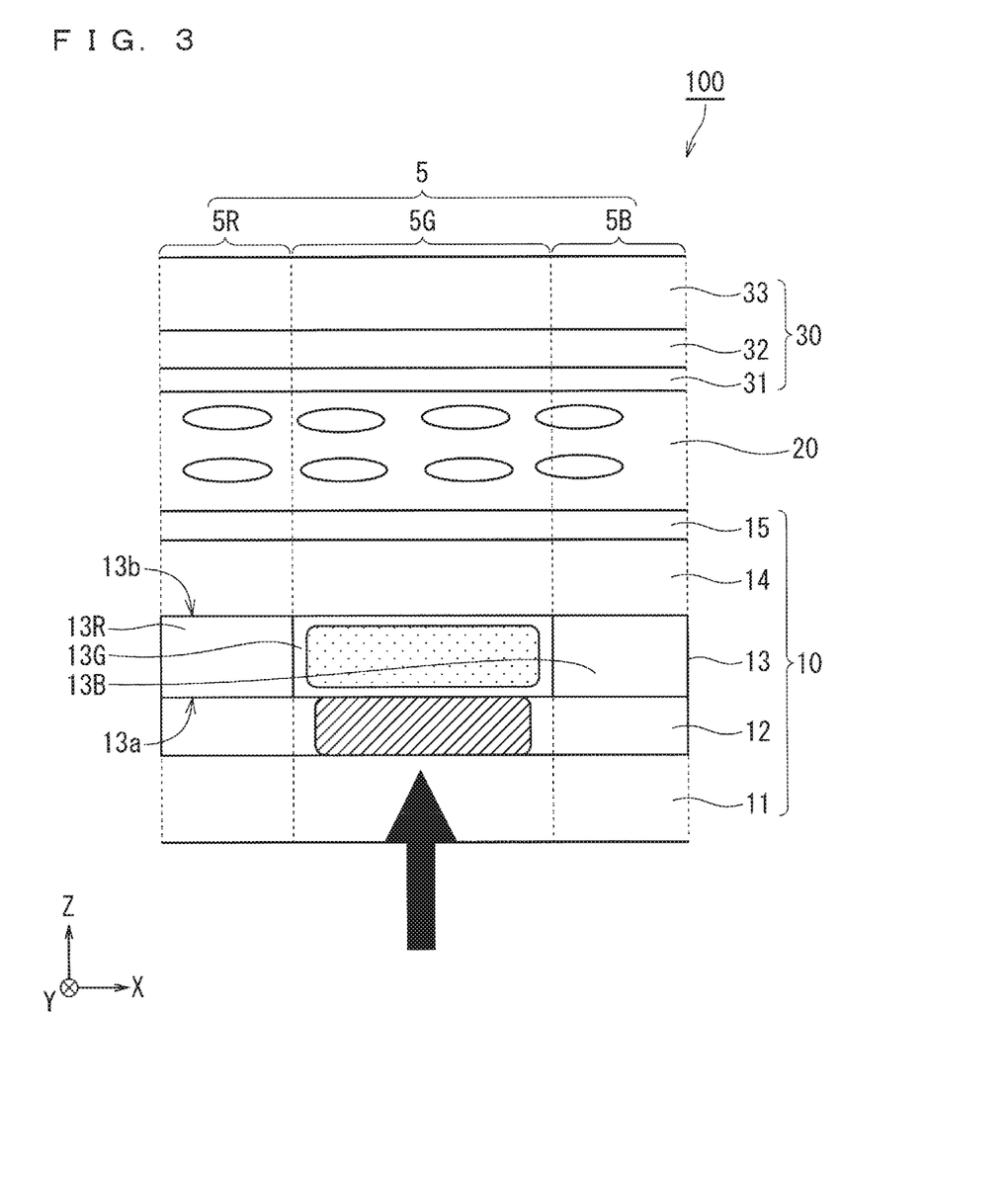
FIG. 3 is a view for describing a pixel repair process according to the first preferred embodiment.

FIG. 3 is a view for describing the image repair process N according to the first preferred embodiment of the present invention. As one example, the whole configuration illustrated in FIG. 3 is a portion corresponding to one pixel 5 including the bright spot pixel.

In the pixel repair process N, an irradiation step is carried out. In the irradiation step, the portion of the change layer 12 corresponding to the defective pixel (bright spot pixel) is irradiated with laser light. In the description below, the portion (region) of the change layer 12 corresponding to the defective pixel (bright spot pixel) is also referred to as a portion to be repaired. FIG. 3 illustrates only a portion corresponding to one pixel 5 in the change layer 12. It is supposed here that the sub-pixel 5G illustrated in FIG. 3 is a bright spot pixel, for example. Specifically, the portion in the sub-pixel 5G in the change layer 12 illustrated in FIG. 3 is the portion to be repaired.

Specifically, in the irradiation step, laser light is focused on the portion to be repaired, and with this state, the laser light is emitted to the portion to be repaired from below the glass substrate 11 of the color filter substrate 10, in order that the portion to be repaired is sufficiently blackened. In other words, the laser light with an output for sufficiently blackening the portion to be repaired is focused on the portion to be repaired and emitted to the portion to be repaired, in the irradiation step.

Since the laser light is emitted to the portion to be repaired, the color material layer 13 formed above the portion to be repaired is slightly blackened. Thus, the pixel repair process N is ended.

With the pixel repair process N, the portion to be repaired can sufficiently be changed into black. Specifically, change of the bright spot pixel into a black spot in which a pixel is displayed in black color can be achieved. In other words, the bright spot pixel can be made into an unnoticeable pixel.

As described above, according to the present preferred embodiment, the color filter substrate 10 includes the color material layer 13 that transmits light to generate colors of an image, and the change layer 12 having a characteristic in which a portion irradiated with laser light changes into black. In other words, the color filter substrate 10 includes the change layer 12 in addition to the color material layer 13.

Thus, if a defective pixel as a bright spot is present in the liquid crystal panel 100, and this defective pixel is repaired, it is only necessary that laser light is focused on the portion of the change layer 12 corresponding to the defective pixel and emitted to this portion. Specifically, it is unnecessary to focus high-output laser light for blackening the color material layer on the color material layer and to irradiate this color material layer with the laser light, unlike the conventional case. Accordingly, damage of the color material layer due to the irradiation of laser light can be prevented.

According to the configuration described above, the defective pixel as the bright spot can easily be changed into a black spot. Consequently, the repair can surely be executed without deteriorating the original performance of the liquid crystal panel.

Even if the change layer 12 is not formed as in the conventional liquid crystal panel, the color material 13G can easily be blackened by the irradiation of laser light. However, it is difficult to blacken the color materials 13R and 13B. It is supposed that the color materials 13R and 13B can be blackened by the irradiation of strong laser light. In this case, damage of the color material layer 13 and damage of the upper layer 14 formed on the color material layer 13 are serious. Such damage contaminates the liquid crystal layer 20, which causes an abnormal alignment.

In view of this, in the present preferred embodiment, the change layer 12 is formed below the color material layer 13. Specifically, the change layer 12 is formed on the surface 13a of the color material layer 13 on which the laser light is incident. According to this configuration, the change layer 12 can easily be blackened, similar to the color material 13G. Therefore, even if the bright spot pixel is present, this bright spot pixel can be changed into black by blackening the change layer 12 below the color materials 13R and 13B, whereby the bright spot pixel can be repaired.

In the present preferred embodiment, since the pixel repair process N described above is carried out, it is unnecessary to completely blacken the color material layer 13 formed on the change layer 12. This can cover the demerit of not being capable of sufficiently blackening the color material 13R and the color material 13B by the irradiation of laser light.

In the present preferred embodiment, the pixel repair process N (repair technique) is carried out by using a material that is designed to be capable of surely repairing the bright spot pixel (defective pixel) without deteriorating the performance of the liquid crystal panel. With this process, a yield and quality of the liquid crystal panel can be enhanced.

The related technique A described above has a problem in which light of the bright spot pixel can be visually confirmed because of an influence of a thickness of a glass, when a screen is viewed from an oblique direction. In the related technique B described above, the color material layer might be damaged due to the irradiation of laser light, so that abnormality occurs on the orientation film that is in contact with the liquid crystal layer. This might cause a new bright spot. In the related technique B, a green color material is easy to be blackened by the irradiation of laser light, but red and blue materials are difficult to be blackened. Therefore, the related technique B has a demerit of not being capable of satisfactorily repairing the bright spot pixel.

The related techniques A and B both have a problem of deteriorating performance of a liquid crystal panel and a problem of not being capable of satisfactorily repairing a bright spot pixel.

In view of this, the present preferred embodiment is configured as described above. Thus, the present preferred embodiment can solve the problems of the related techniques A and B.

<Second preferred embodiment>

Figure 4:
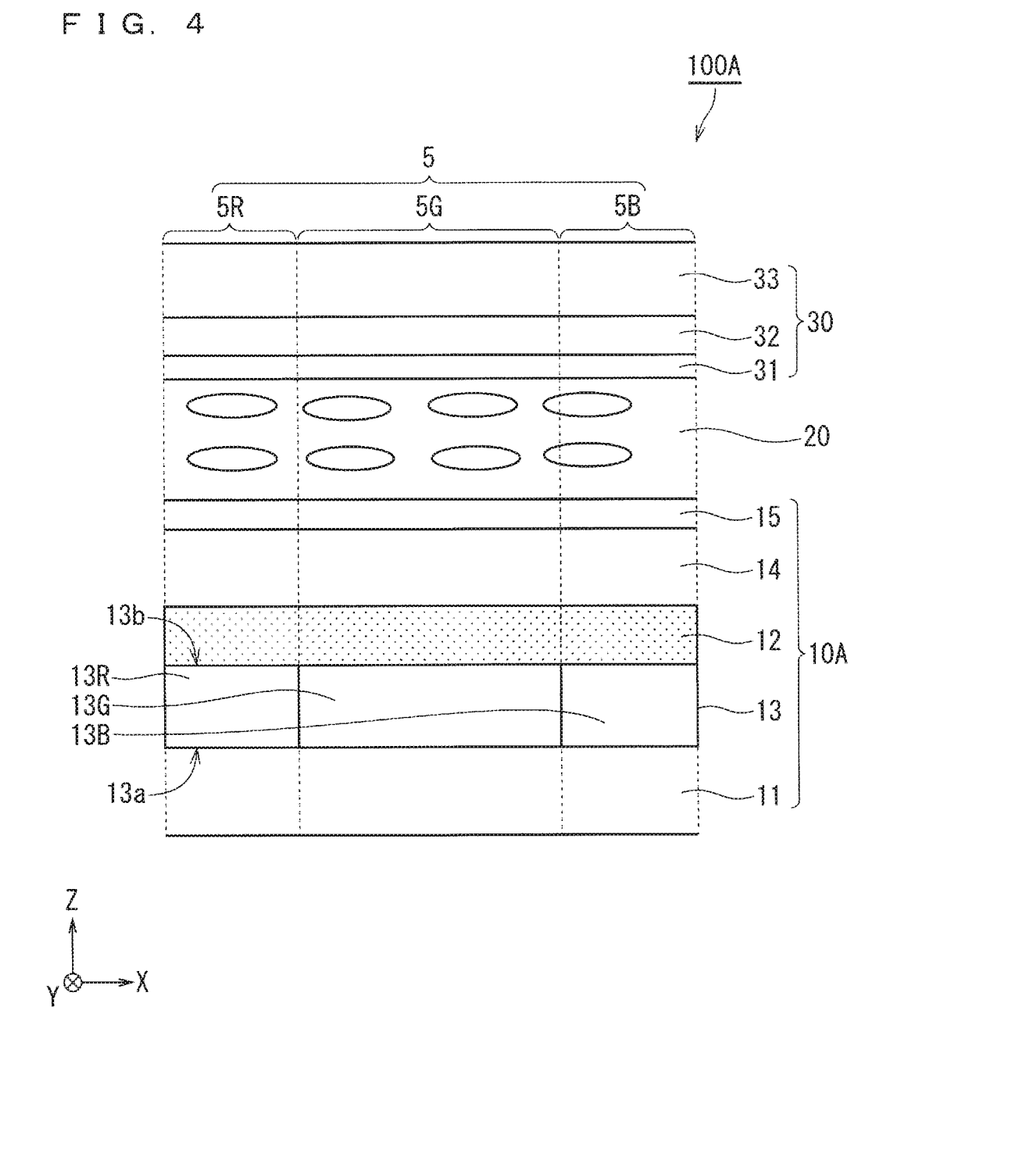
FIG. 4 is a sectional view illustrating a part of a liquid crystal panel according to a second preferred embodiment.

FIG. 4 is a sectional view illustrating a part of a liquid crystal panel 100A according to a second preferred embodiment of the present invention. Specifically, FIG. 4 is a sectional view illustrating a pixel 5 included in the liquid crystal panel 100A, corresponding to a position similar to the position in the configuration illustrated in FIG. 2.

The liquid crystal panel 100A is different from the liquid crystal panel 100 in FIG. 2 in that the liquid crystal panel 100A has a color filter substrate 10A instead of the color filter substrate 10. The other configuration of the liquid crystal panel 100A is the same as that of the liquid crystal panel 100, so that the detailed description will not be repeated.

Compared to the color filter substrate 10, the position where the change layer 12 is formed is different in the color filter substrate 10A. The other configuration of the color filter substrate 10A is the same as that of the color filter substrate 10, so that the detailed description will not be repeated.

In the present preferred embodiment, the change layer 12 is formed between the color material layer 13 and the upper layer 14. Specifically, the change layer 12 is formed on the color material layer 13. In other words, the change layer 12 is formed on the surface 13b of the color material layer 13. As described above, the surface 13b is a surface from which light from the light source L is emitted.

Subsequently, a process (hereinafter also referred to as a pixel repair process A) of repairing a defective pixel (bright spot pixel), which is present in the plurality of pixels 5 included in the liquid crystal panel 100A, will be described.

Figure 5:
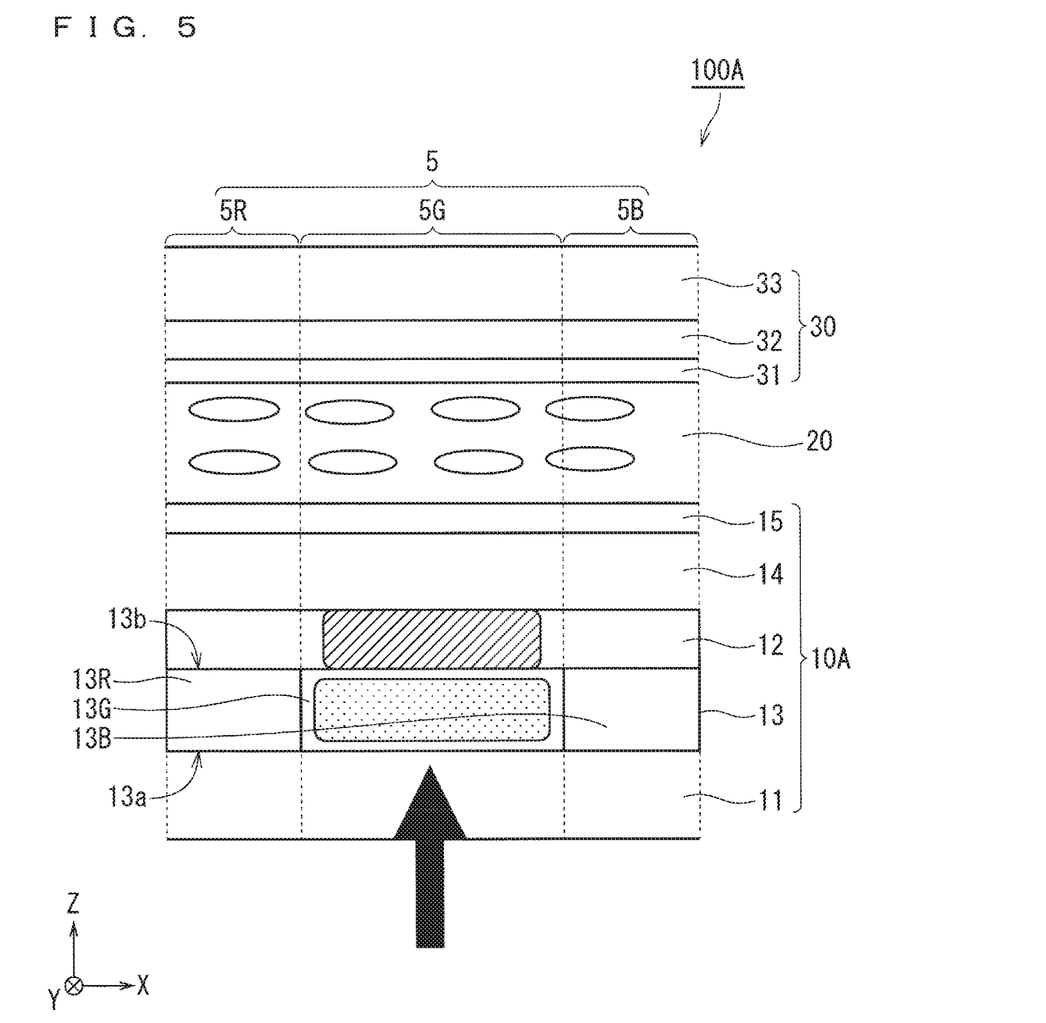
FIG. 5 is a view for describing a pixel repair process according to the second preferred embodiment.

FIG. 5 is an explanatory view for describing the image repair process A according to the second preferred embodiment of the present invention. As one example, the whole configuration illustrated in FIG. 5 is a portion corresponding to one pixel 5 including the bright spot pixel. It is supposed here that the sub-pixel 5G illustrated in FIG. 5 is a bright spot pixel, for example. Specifically, the portion in the sub-pixel 5G in the change layer 12 illustrated in FIG. 5 is the portion to be repaired.

In the pixel repair process A, an irradiation step A is carried out. In the irradiation step A, the portion (potion to be repaired) of the change layer 12 corresponding to the defective pixel (bright spot pixel) is irradiated with laser light.

Specifically, in the irradiation step A, laser light is focused on the portion to be repaired, and with this state, the laser light is emitted to the portion to be repaired from below the glass substrate 11 of the color filter substrate 10A, in order that the portion to be repaired is sufficiently blackened. In other words, the laser light with an output for sufficiently blackening the portion to be repaired is focused on the portion to be repaired and emitted to the portion to be repaired, in the irradiation step A.

Since the laser light is emitted to the portion to be repaired, the color material layer 13 formed below the portion to be repaired is slightly blackened. Thus, the pixel repair process A is ended.

With the pixel repair process A, the portion to be repaired can sufficiently be changed into black. Specifically, change of the bright spot pixel into a black spot in which a pixel is displayed in black color can be achieved.

As described above, according to the present preferred embodiment, the change layer 12 is formed on the color material layer 13. Specifically, the change layer 12 is formed on the surface 13b of the color material layer 13. This configuration can also provide an effect similar to the first preferred embodiment. Specifically, damage of the color material layer 13 by the irradiation of laser light can be prevented.

According to the present preferred embodiment, the color material 13R and the color material 13B cannot sufficiently be blackened by the pixel repair process A. However, the change layer 12 formed on the color material layer 13 can sufficiently be blackened by the pixel repair process A. Therefore, a bright spot pixel can be changed into black, whereby the bright spot pixel can be repaired.

While the invention has been shown and described in detail, the foregoing description is in all aspects illustrative and not restrictive. It is therefore understood that numerous modifications and variations can be devised without departing from the scope of the invention.

What is claimed is:

1. A color filter substrate that is used for a liquid crystal panel displaying an image, and transmits light to generate colors of the image, said color filter substrate comprising:
    a color material layer that transmits light to generate colors of the image; and
    a change layer that is formed on a surface of said color material layer from which said light is emitted, that has translucency, and that has a characteristic in which a portion irradiated with laser light changes into black,
    wherein said color filter substrate further comprises:
    an orientation film that controls an orientation of a liquid crystal molecule; and
    an organic layer made of an organic film, wherein said organic layer is formed on said change layer,
wherein said orientation film is formed directly on said organic layer,
wherein said organic layer is formed between said orientation film and said change layer,
wherein at least a part of said organic layer is formed in a portion of said color filter substrate, said portion transmitting said light, and
wherein said change layer is formed between said organic layer and said color material layer so as to be in contact with said organic layer and said color material layer.

2. A liquid crystal panel comprising:
a color filter substrate that is used for the liquid crystal panel displaying an image, and transmits light to generate colors of the image, said color filter substrate comprising:
a color material layer that transmits light to generate colors of the image; and
a change layer that is formed on a surface of said color material layer from which said light is emitted, that has translucency, and that has a characteristic in which a portion irradiated with laser light changes into black,
wherein said color filter substrate further comprises:
an orientation film that controls an orientation of a liquid crystal molecule; and
an organic layer made of an organic film,
wherein said organic layer is formed on said change layer,
wherein said orientation film is formed directly on said organic layer,
wherein said organic layer is formed between said orientation film and said change layer,
wherein at least a part of said organic layer is formed in a portion of said color filter substrate, said portion transmitting said light, and
wherein said change layer is formed between said organic layer and said color material layer so as to be in contact with said organic layer and said color material layer.

3. A repair method for repairing a defective pixel that is a bright spot and is included in said liquid crystal panel which uses said color filter substrate according to claim 1, the method comprising:
irradiating a portion of said change layer corresponding to said defective pixel with laser light.

* * * * *